United States Patent [19]

Salmon

[11] Patent Number: 4,732,751

[45] Date of Patent: Mar. 22, 1988

[54] HIGH PURITY LITHIUM OXIDE PROCESS

[75] Inventor: Dennis J. Salmon, Gastonia, N.C.

[73] Assignee: Lithium Corporation of America, Gastonia, N.C.

[21] Appl. No.: 56,575

[22] Filed: Jun. 1, 1987

Related U.S. Application Data

[63] Continuation-in-part of Ser. No. 850,637, Apr. 11, 1986, abandoned.

[51] Int. Cl.$^4$ .............................................. C01D 15/02
[52] U.S. Cl. .................................................. 423/641
[58] Field of Search ............................... 423/641, 203

[56] References Cited

U.S. PATENT DOCUMENTS

| | | | |
|---|---|---|---|
| 2,962,358 | 11/1980 | Strater | 423/582 |
| 3,321,277 | 5/1967 | Bach | 423/641 |
| 4,221,775 | 9/1980 | Anno et al. | 423/641 |

FOREIGN PATENT DOCUMENTS 146730  9/1962  U.S.S.R. ................................ 423/461

OTHER PUBLICATIONS

Stecura, Stephan, "Identification of a New Lithium Oxide $Li_3O_2$", Journal of Less-Common Metals 33, No. 2, 11/73, pp. 219-227.

Vasileu, V. G. et al., "Preparation and Physicochemical Properties of Lithium Aluminate, Titanate, Niobate, Silicates, and Oxide", Inorganic Material (USA), vol. 16, No. 2, Feb. 1980, (publ. 1980), pp. 222-224.

*Primary Examiner*—Robert L. Stoll
*Attorney, Agent, or Firm*—Charles C. Fellows; Eugene G. Seems

[57] ABSTRACT

A process for producing high purity lithium oxide comprising decomposing lithium peroxide at a temperature of 350° to 450° C., in an inert atmosphere in the substantial absence of water to produce impure lithium oxide followed by heating the impure lithium oxide under moderate vacuum at 900° C. or more for at least one hour to obtain high purity lithium oxide of 99% or greater purity.

3 Claims, No Drawings

HIGH PURITY LITHIUM OXIDE PROCESS

This is a continuation-in-part of application Ser. No. 850,637 filed April 11, 1986, now abandoned.

This invention concerns a high temperature, two-step process for making lithium oxide of greater than 99% purity from low purity (85 to 95%) lithium peroxide.

Lithium oxide typically contains small amounts of lithium hydroxide, lithium carbonate or a mixture of these impurities which come from the raw materials from which lithium oxide is produced. The principal end uses of lithium oxide are in making pharmaceuticals, lithium batteries and in thermonuclear fusion reactors. However, in the thermonuclear fusion processes, high purity lithium oxide is desired because the impurities, lithium hydroxide and lithium carbonate, melt at too low a temperature. In lithium battery uses, the lithium hydroxide and lithium carbonate impurities are not soluble in the organic solvents used in making the lithium batteries.

A method of producing lithium oxide containing no lithium hydroxide from lithium peroxide is disclosed by R. O. Bach in U.S. Pat. No. 3,321,277. Bach reacted lithium hydroxide with hydrogen peroxide to produce lithium peroxide. Bach washed his lithium peroxide several times with methanol to remove lithium hydroxide. (See also U.S. Pat. No. 2,962,358 Method of Making Lithium Peroxide in Methanol.) Bach then thermally decomposed his lithium hydroxide free lithium peroxide to lithium oxide by heating slowly at 225° to 250° C. in an inert atmosphere, preferably under a vacuum of 1 to 5 mm of mercury for up to 24 hours. Bach produced a 97% pure lithium oxide containing 2.4% lithium carbonate and no lithium hydroxide.

U.S. Pat. No. 2,424,512, issued to R. A. Stauffer, discloses a process for recovery of lithium oxide from silicate and phosphate ores. The process pelletized the ores with lime and heated the pellets under reduced pressure of below 1 mm of mercury at a temperature above 900° C. causing the lime to displace the lithium oxide. The oxide was distilled off and condensed.

Inorganic synthesis, by A. J. Cohen, Vol. 5, Ch. 1A, pp. 3–4, McGraw-Hill, New York (1957) reported a process for producing lithium oxide by heating anhydrous lithium hydroxide at about 675° C. under a vacuum for one-half hour.

U.S. Pat. No. 4,221,775 to James A. Anno and Howard H. Bowing disclosed making porous lithium oxide from lithium hydroxide having a purity of at least 97%. The lithium hydroxide monohydrate starting material was heated to its melting point to drive off the water of crystallization to produce anhydrous lithium hydroxide. Continued heating of the anhydrous lithium hydroxide above its melting point was then carried out in an inert atmosphere while suppressing conversion of the lithium hydroxide to lithium oxide. The molten anhydrous lithium hydroxide was then cooled to a temperature below its melting point while protected by the inert atmosphere to a temperature below 150° C. The cooled lithium hydroxide was then subjected to a pressure not exceeding two microns of mercury preferably below 1 micron of mercury to a temperature of 150° to about 200° C. and held at that temperature until complete conversion to lithium oxide occurred. The purity of the product was 98.1%.

Russian Pat. No. 146,730 discloses a process for converting apparently pure lithium hydroxide to lithium oxide by thermal decomposition of the hydroxide. The lithium hydroxide monohydrate is first carefully dehydrated at 250°–300° C. using a vacuum of 600–650 mm Hg for 2–3 hours. Then, over a period of 5–6 hours the temperature is raised to 900° C. and the pressure adjusted to a few mm Hg. This temperature is maintained until the pressure is reduced to 1 mm Hg after which the temperature is raised to 1000° C. The complete cycle including milling the sintered product requires 16 hours.

Higher purity lithium oxide is desired by both the battery and fusion industries but lithium oxide in purities of 99% or greater has not been commercially available. The continuing need for a process for producing high purity $Li_2O$ has led to a number of processes for producing lithium oxide. Nevertheless, the need continues for a practical process which will remove both lithium carbonate and lithium hydroxide and produce a product having a purity of greater than 99%.

The present invention provides a two-step process for producing high purity, 99% or greater, lithium oxide by decomposing impure lithium peroxide containing up to 16% by weight lithium carbonate or lithium hydroxide or a mixture thereof to impure lithium oxide containing not more than 25% by weight lithium carbonate or lithium hydroxide or mixtures thereof by decomposing the impure lithium peroxide at 350° to 450° C. in an inert atmosphere in the substantial absence of water to produce an impure lithium peroxide then heating the impure lithium oxide to a temperature between about 900° C. and below the melting temperature of lithium oxide under vacuum to produce lithium oxide having a purity of 99% or greater. Surprisingly the product is not sintered when the lithium peroxide has a purity of at least 90%.

A key feature of this process is the elimination of active oxygen and moisture during the low temperature heating in step 1 of the process. This reduces corrosion of the crucible material, degradation of the product and sintering; it further consolidates the crucible charge into a higher assay material of approximately 90 to 95% lithium oxide which contains only lithium hydroxide and lithium carbonate impurities. With reduced impurities at high temperatures, problems due to corrosion of the crucibles and sintering of the product are reduced or eliminated. Under the process conditions of this invention, the product is obtained as a friable, non-sintered powder which can easily be removed from its container.

The first step of the process decomposes lithium peroxide of 84% or higher, typically 85% to 95%, purity at temperatures between 350° to about 450° C. to produce impure lithium oxide containing as impurities residual amounts of not more than 25% by weight of lithium carbonate or lithium hydroxide or mixtures thereof. Temperatures above 450° C. are avoided because lithium hydroxide melts around 450° C. and causes the product to be sintered. Temperatures below 350° C. are not used because lithium peroxide decomposes very slowly below 350° C.

The lithium peroxide in step 1 is heated under an inert atmosphere such as argon, nitrogen, helium, neon or krypton in an inert container which may be aluminum, stainless steel, alumina, nickel, high temperature or thermal glass or other materials inert to lithium compounds at elevated temperatures. It is important that water be excluded from the process. It is helpful but not necessary to exclude oxygen.

The lithium oxide product from the first step, containing appreciable amounts, up to 25% by weight, of lithium carbonate or lithium hydroxide or mixtures thereof as contaminants, is heated to about 900° C. or higher under moderate vacuum, preferably in a crucible, which may be a vibrating or rotary crucible, a crucible vibrated by ultrasonic energy or other crucibles having some vibratory or agitation means. Useful crucibles are made of alumina, magnesia, graphite, metal or metal coated with a high temperature inert film or coating.

Temperatures below about 900° C. can be employed but lower purity lithium oxide is produced. Higher temperatures, below the melting temperature of lithium oxide, can be employed and a finely powdered product produced. Temperatures higher than 1000° C. are not necessary to produce the desired product of this invention, so heating from about 900° to about 1000° C. is adequate and preferred. Heating up to 1200° C. to 1300° C. can be employed but at these higher temperatures the lithium oxide product attack on the crucible is unduly increased.

The second step of the process of this invention is conducted under moderate vacuum. Moderate vacuum is necessary to exclude oxygen and help remove the decomposition products of the small amounts of lithium carbonate and/or lithium hydroxide from which the lithium peroxide starting material for step 1 was produced. The vacuum produced by commercially available vacuum furnaces capable of developing a vacuum of at about 0.2 kPa or lower is adequate. Preferred vacuum is in the range of about 0.1 kPa or less.

Lithium carbonate and lithium hydroxide decompose in the temperature range of 800° to 1000° C., to produce lithium oxide and water or lithium oxide and carbon dioxide. This conversion can be partially accomplished in an inert atmosphere at 900° C. or above at atmospheric pressure but it proceeds totally at 900° C. or above under vacuum. At temperatures above 1000° C. attack by the lithium chemicals on the crucible is greater than at lower temperatures. Crucible attack is avoided because it is undesirable to have crucible materials in the lithium oxide product.

Surprisingly in view of the prior art, the present process for producing high purity lithium oxide employs processing conditions which do not require exotic or special equipment or unusual operating conditions to produce lithium oxide having purities not previously available. Moreover, the lithium oxide is a powdered substantially non-sintered product. However, at between 20% and 25% impurities in the intermediate lithium oxide product some product lumps may occur in the final product.

The following examples further illustrate the invention.

EXAMPLE 1

An aluminum container was charged with 450 g of a dry 90% lithium peroxide sample containing 8% lithium hydroxide and 2% lithium carbonate. The sample was then heated under argon under anhydrous, non-oxidizing conditions at 425° C. for two hours. The product of the first stage heating, 300 g of 85% lithium oxide containing 12% lithium hydroxide and 3% lithium carbonate, was placed in a high purity (99%) alumina crucible and heated to 950° C. under a vacuum of about 0.1 kPa for two hours. The product (270 g) analyzed as 99.97% lithium oxide. The product was mostly a fine powder that contained several small lumps of product.

COMPARISON EXAMPLE A

Example 1 was repeated using an 850° C. heating temperature during the second stage heating under vacuum. The purity of the lithium oxide product was 97%.

COMPARISON EXAMPLE B

Example 1 was repeated except no vacuum was employed during the second stage heating at 950° C. and the heating was done under argon. The lithium oxide purity was 95%.

COMPARISON EXAMPLE C

A one-step process at 900° C. done separately under vacuum and argon was attempted but the decomposition of lithium peroxide was so energetic that both product and reactant were expelled violently from the crucible.

COMPARISON EXAMPLE D

A sample of high purity (99%) lithium hydroxide was placed in a suitable crucible in an oven capable of being subjected in a heated sample to a very high vacuum. The sample was subjected to moderate vacuum while the temperature was slowly raised over a twelve hour period to 900° C. The vacuum pressure was reduced to $10^{-5}$ to $10^{-6}$ Torr and the sample held at this pressure and 900° C. for 12 hours. The sample, when removed from the vacuum oven, was totally sintered into a solid the shape of the crucible. The product was ground and found to assay 97% lithium oxide.

EXAMPLES 2–4 and COMPARISON EXAMPLE E

A high purity lithium peroxide, assaying 92.6% and containing 7.4% of a mixture of lithium hydroxide (5.4%) and lithium carbonate (2%), was heated under argon and under anhydrous, non-oxidizing conditions for 2 hours at 425° C. The lithium oxide product assayed 88.7% and contained 3.1% lithium carbonate and 8.2%. A portion of this lithium oxide sample was treated as described in the stage two conversion in Example 1, i.e., heated to 950° C. at a pressure of 0.1 kPa for two hours. The balance of the sample was stored during which storage the purity of the lithium oxide decreased and the impurities, lithium hydroxide and lithium carbonate increased. Samples were taken, assayed, and subjected to stage two conversion procedure. The assays and results of these experiments are set forth in the following table.

TABLE

| | Intermediate Product | | Final Product | |
|---|---|---|---|---|
| Example No. | % $Li_2O$ | % Impurities | % $Li_2O$ | Product Description |
| 2 | 88.7 | 11.3 | 99.9 | Not sintered-powdery |
| 3 | 78.0 | 22.0 | 99.5 | Partial sintering-large pieces |
| 4 | 75.0 | 25.0 | 99.5 | Partial sintering-large pieces |
| E | 70.0 | 30.0 | 99.0 | Almost totally sintered-one major piece and several small pieces |

What is claimed is:

1. A process for producing high purity lithium oxide from lithium peroxide containing lithium carbonate or lithium hydroxide or a mixture thereof comprising the steps of:
(a) decomposing lithium peroxide containing up to 16% by weight of lithium carbonate or lithium hydroxide or a mixture thereof at a temperature of 350° to 450° C., in an inert, anhydrous atmosphere to produce impure lithium oxide; and
(b) heating the impure lithium oxide containing up to 25% by weight of lithium carbonate or lithium hydroxide or a mixture thereof under a pressure of not more than 0.2 kilo Pascals at 900° C. or more for at least one hour to obtain high purity lithium oxide of 99% or greater purity.

2. The process of claim 1 wherein the impure lithium oxide of step (a) is heated in step (b) at a temperature between 900° C. and 1000° C.

3. The process of claim 2 wherein the impure lithium oxide from step (a) is heated in step (b) under a pressure of not more than 0.1 kilo Pascals.

* * * * *